United States Patent

[11] 3,565,415

| [72] | Inventor | Leland F. Blatt<br>Grosse Pointe, Mich. (24121 Mound Rd.,<br>Warren, Mich. 48091) |
|---|---|---|
| [21] | Appl. No. | 742,646 |
| [22] | Filed | July 5, 1968 |
| [45] | Patented | Feb. 23, 1971 |

[54] POWER-OPERATED BAR CLAMP
1 Claim, 8 Drawing Figs.

| [52] | U.S. Cl. | 269/30,<br>269/32, 269/228 |
|---|---|---|
| [51] | Int. Cl. | B23q 3/08 |
| [50] | Field of Search | 269/30, 32,<br>34, 228; 74/106 |

[56] References Cited
UNITED STATES PATENTS

| 2,908,205 | 10/1959 | Furman | 269/32X |
| 3,302,943 | 2/1967 | Mericle | 269/32 |
| 3,347,542 | 10/1967 | Mericle | 269/32 |

*Primary Examiner*—Lester M. Swingle
*Attorney*—Cullen, Sloman & Cantor

ABSTRACT: A workpiece clamp actuated by a power cylinder and having a lever type clamp arm and a toggle linkage connecting the piston rod of the power cylinder and such lever clamp arm, to insure locking of the parts in workpiece holding position and to provide two mechanical advantages.

INVENTOR
LELAND F. BLATT

INVENTOR
LELAND F. BLATT

INVENTOR
LELAND F. BLATT

INVENTOR
LELAND F. BLATT

BY Cullen, Sloman, & Cantor

ATTORNEYS

POWER-OPERATED BAR CLAMP

This application discloses a novel workpiece clamp as described briefly above.

Embodiments of such clamp are shown diagrammatically and with parts omitted for clarity in the appended drawings whose:

STRUCTURE

Figure 1:
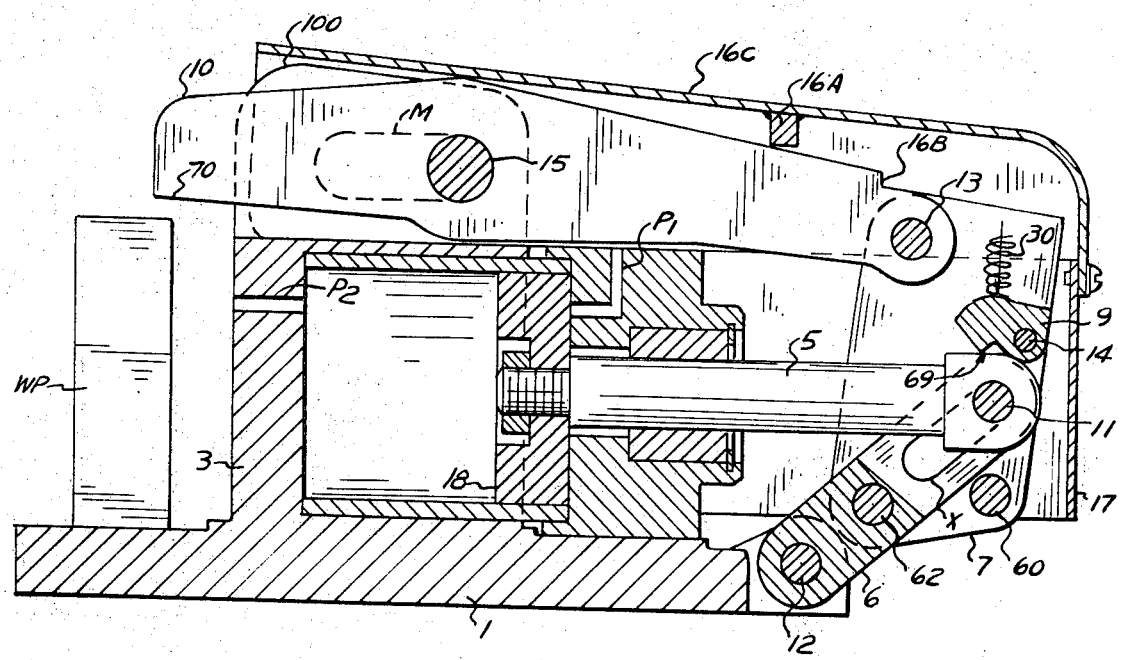
FIG. 1 is a vertical section of one embodiment of the clamp with parts shown in released position.

In the form of FIGS. 1—4, there is a body 1 which includes a cylinder 3 having ports P1 and P2 and containing a piston 18 on the left end of piston rod 5 guided for straight line movement.

The right end of piston rod 5 is connected by pin 11 to toggle link 6, the latter being pivoted on a fixed pivot pin 12 to the body and having a slot X receiving pin 11, and a corner abutment 68.

Pin 62 pivotally connects link 6 to plate 7, the latter being pivotally connected by pin 13 to a clamp lever or arm 10 whose left end 70 clamps a workpiece WP to body 1, with arm 10 having a pin 15 riding in a slot M in ear portions 100 of the body. Arm 10 has an abutment 16B adapted to be held by a lug 16A of a fixed cover 16C.

Fixed on plate 7 is a stop pin 60.

Pivotally mounted at 14 on plate 7 is a detent 9, spring loaded by spring 30, and having a part 69 for gripping link 6 at 68.

Figure 2:
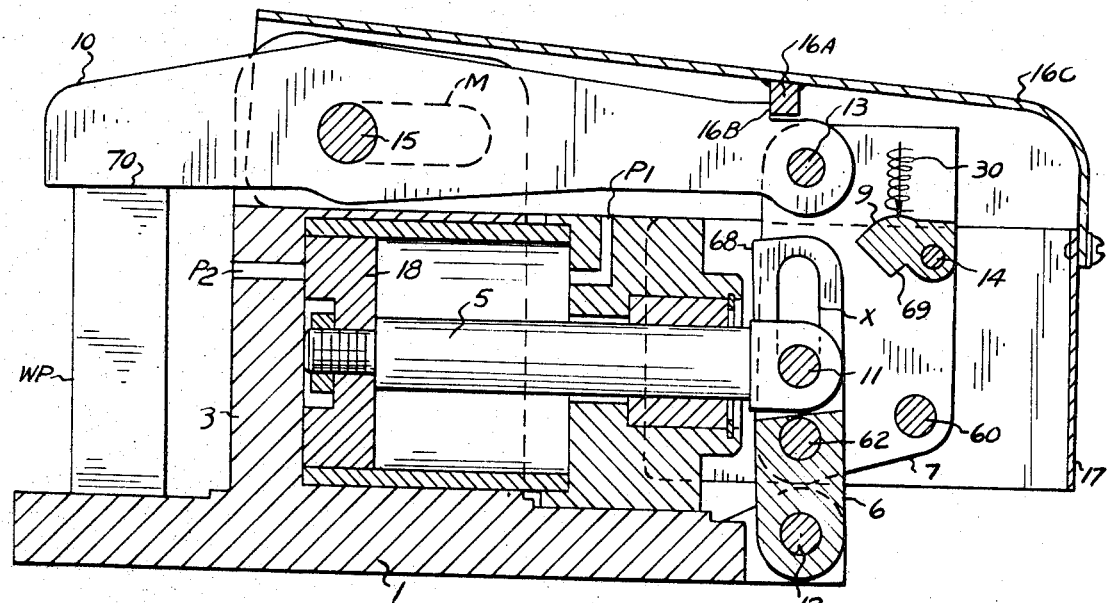
FIG. 2 is a similar view but with the parts shown in locked position.
Figure 3:
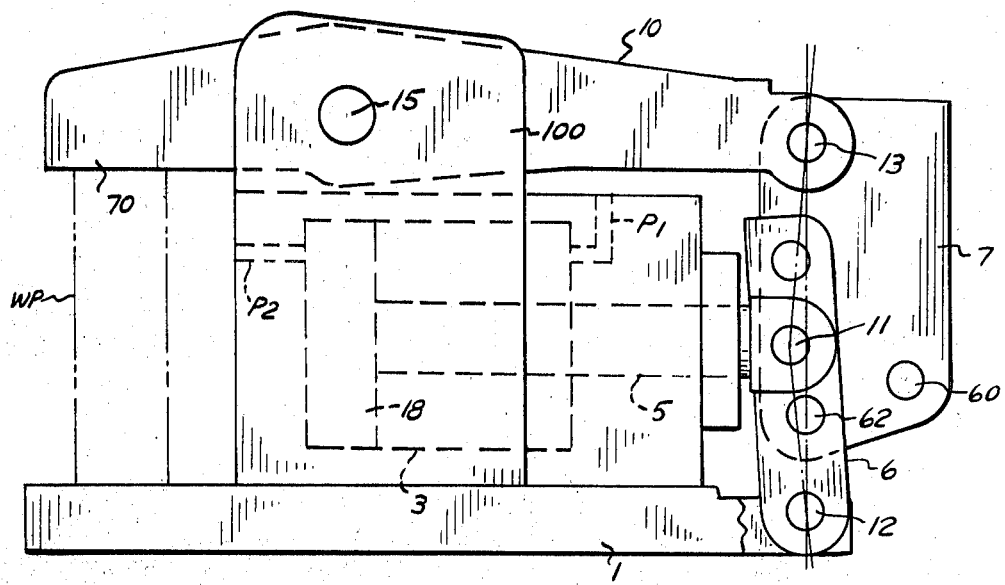
FIG. 3 is a simplified diagram corresponding to FIG. 2.
Figure 4:
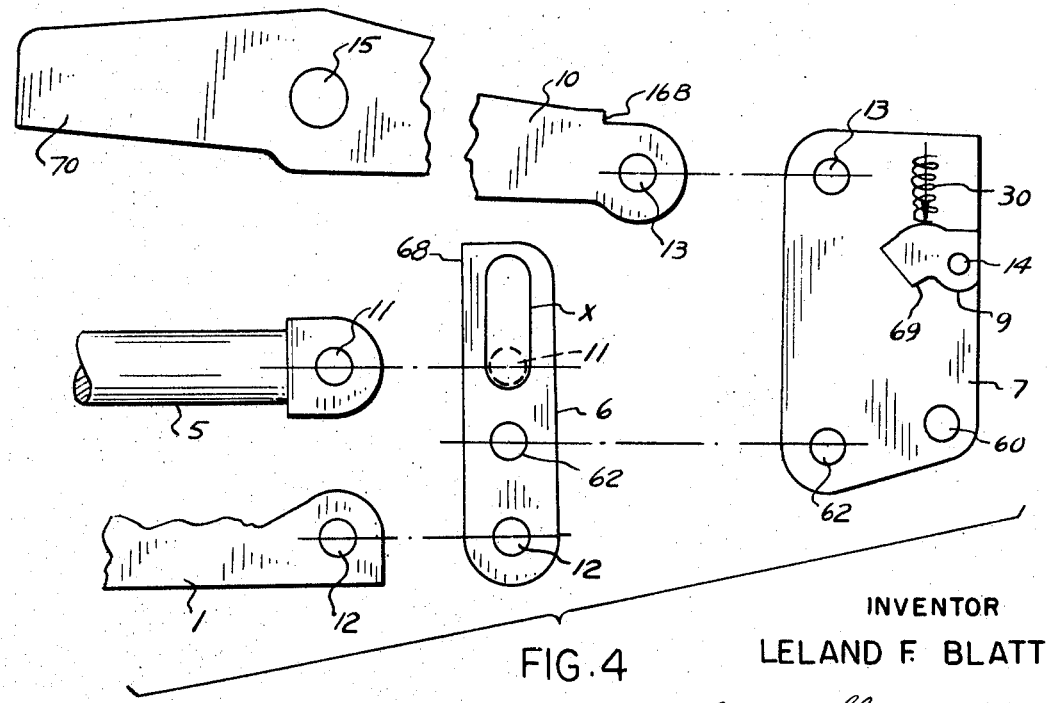
FIG. 4 shows the toggle links per se.

Means, not shown, but well known to the art, are provided to hold detent 9 in the position shown in FIG. 2, under the influence of spring 30 shown diagrammatically.

Body 1 has upstanding spaced ears 100 which receive between them and thus guide clamp arm 10, and are also formed with slots M for arm pin 15.

To these ears 100 are secured fixed cover 16C formed with holding lug 16A for abutment 16B of clamp arm 10.

Fixed cover 16C mounts a lower cover part 17, also secured to body 1.

Fixed pivot 12 in body 1 provides the sole mounting for link 6 and plate 7, located at the right of body 1, and contained in the space under and to the left of covers 16C and 17. Links b-—7 are not otherwise free, not only being connected to each other at 62, but also connected to piston rod 5 at 11, and connected to clamp arm 10 at 13.

Operation from Release (FIG. 1) to Locking (FIG. 2) for Clamping. Cylinder 3 is pressurized at port P1, and vented at port P2. This moves piston 18 to the left extending the toggle linkage 6—7 whose end pivots are the fixed pivot 12 and the clamp arm pivot pin 13, and whose center pivot is pin 62 below pin 11 on the right end of piston rod 5, with such pin 11 being then slightly to the left of the straight line connecting pivots 13—12. Plate 7 biases pin 13 upwardly to rock lever clamp arm 10 counterclockwise on pivot 15, so that the left end 70 of arm 10 biases workpiece WP down to body 1. Arm 10 is locked by fixed lug 16A at 16B.

Locking, (FIG. 2). This is established by the movement of piston 18 to the left in cylinder 3, with toggle 6—7 in such a position that pin 11 is to the left of the line 13—12 and with arm 10 locked at 16A—16B.

Release (FIG. 1). Cylinder 3 is depressurized at P1 and pressurized at P2. Piston 18 moves to the right, swinging link 6 clockwise on fixed pivot 12, until abutment 69 moves past detent 9 and is gripped by it at 68—69. Plate 7 shifts to the right and downwardly, swinging with pin 62 which connects link 6 to plate 7, and which moves to the right as link 6 swings to the right. As links 6 and 7 shift, detent 9 is moved into position to grip link 6 at 68—69.

Stop pin 60 of plate 7 moves to the right for stopping swinging of link 6.

Pin 13 moves to the right and down to release arm 10 from being held at 16A—16B and shifts left end 70 of arm 10 up and to the right, pin 15 of arm 10 sliding to the right in body slot M, thus releasing pressure of clamp arm at 70 from workpiece WP

ADVANTAGES

1. Two mechanical advantages are present between the piston 18 and the left end 70 of clamp arm 10: (a) a) the toggle action provided by linkage 6—7, on end pivots 12—13, with center pivot 11 connected to the piston rod 5; (b) b) the leverage of arm 10, centrally pivoted on pin 15 in body slot M, and connected at one end to the toggle linkage 6—7 by pivot 13, and with the other end 70 engaging the workpiece WP.

Thus, tremendous clamping pressures may be applied at 70 with a relatively low fluid pressure available to cylinder 3, to bias on the right or rod side of piston 18.

2. Locking of the toggle links 6—7 and of the clamp arm 10, established when the piston 18 is pressurized by pressure at cylinder port P1, and piston 18 has moved to the left in cylinder 3, insures clamping pressure at 70 on the workpiece WP being maintained indefinitely, even despite a possible failure of fluid pressure at port P1 occurring after toggle links 6—7 were locked in the locked position of FIG. 2.

STRUCTURE

In the form of FIGS. 5—8, there is a body 101 which includes a piston 118 on the left end of piston rod 105 guided for straight line movement in cylinder 103.

The right end of piston rod 105 is connected by pin 111 to second toggle link 106, the latter being pivoted on a fixed pivot pin 112 to the body and having a slot X1 receiving pin 111.

Pin 162 pivotally connects link 106 to a first link or plate 107, the latter being pivotally connected by pin 113 to a clamp lever or arm 110 whose left end 170 clamps a workpiece to body 101, with arm 110 having a pin 115 riding in a slot M1 in ear portions 200 of the body. Arm 110 has an abutment 116B adapted to be held by a lug or spacer 116A of a fixed cover 116C.

Plate 107 has an L-shaped cam slot 117 receiving pin 111 also received in slot X1 of link 106.

Body 101 has upstanding spaced ears 200 which receive between them and thus guide clamp arm 110, and are also formed with slots M1 for arm pin 115.

To these ears 200 are secured fixed cover 116C formed with holding spacer or lug 116A for abutment 116B of clamp arm 110.

Fixed pivot 112 in body 101 provides the sole mounting for links 106—107, located at the right of body 101, and contained in the space under and to the left of cover 116C. Links 106—107 are not otherwise free, not only being connected to each other at 162, but also connected to piston rod 105 at 111, and connected to clamp arm 110 at 113.

Operation from Release (FIG. 5) to Locking (FIG. 6) For Clamping. The cylinder 103 is pressurized at port P, and vented at port P2. This moves piston 118 and piston rod 105 to the left, extending the toggle linkage 106—107 whose end pivots are the fixed pivot 112 and the clamp arm pivot pin 113, and whose center pivot is pin 111 on the right end of piston rod 105, with such pin 111 being then slightly to the left of the straight line 113—112. Plate 107 biases pin 113 upwardly to rock lever clamp arm 110 counterclockwise on pivot 115, so that the left end 170 of arm 110 biases a workpiece down to body 101. Arm 110 is locked by fixed lug 116A at 116B.

Figure 6:
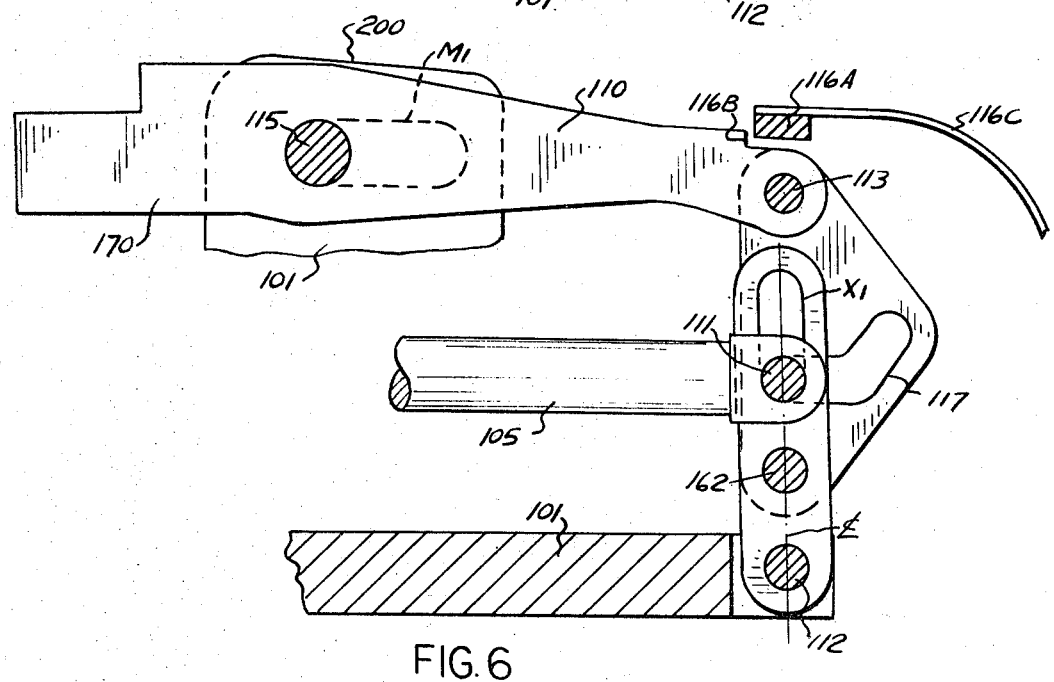
FIG. 6 is a similar view but with the parts shown in locked position.
Figure 7:
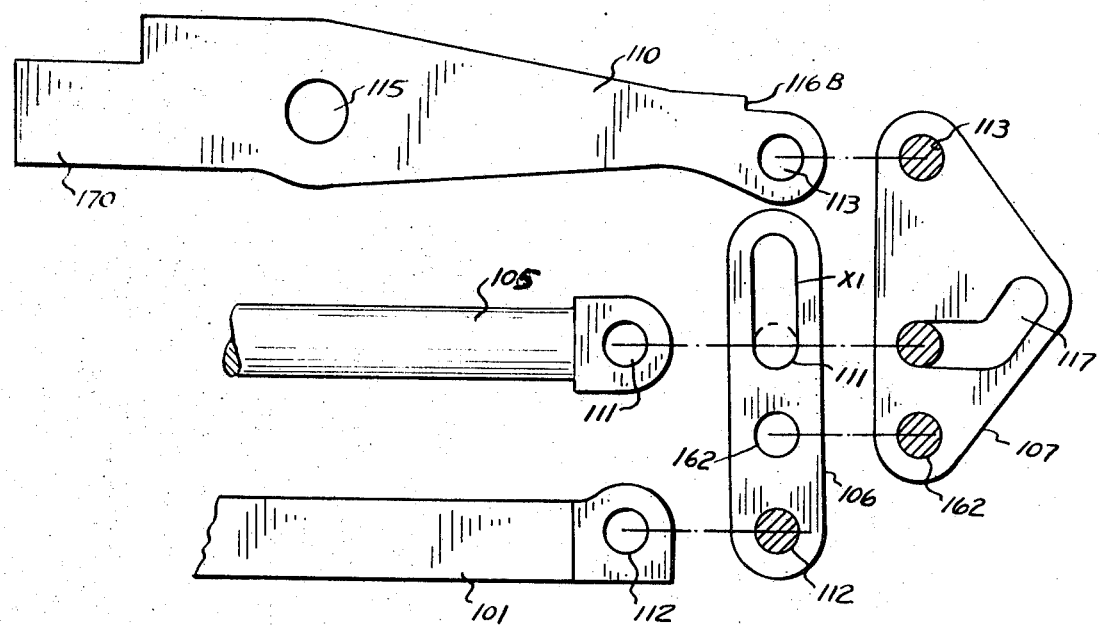
FIG. 7 shows the parts, per se.
Figure 8:
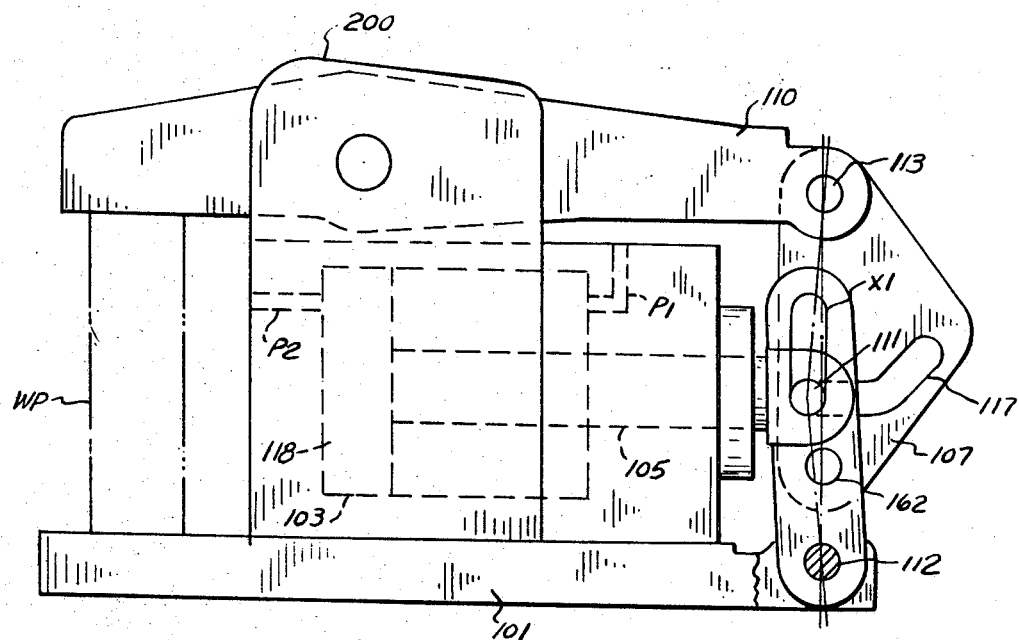
FIG. 8 is a simplified diagram corresponding to FIG. 6.

Locking, (FIG. 6). This is established by the piston 118 being at the left end of cylinder 103 with toggle 106—107 in such a position that pin 111 is to the left of the line 113—112; and with arm 110 locked at 116A—116B against moving to the right by any horizontal force on the left end of arm 110.

Figure 5:
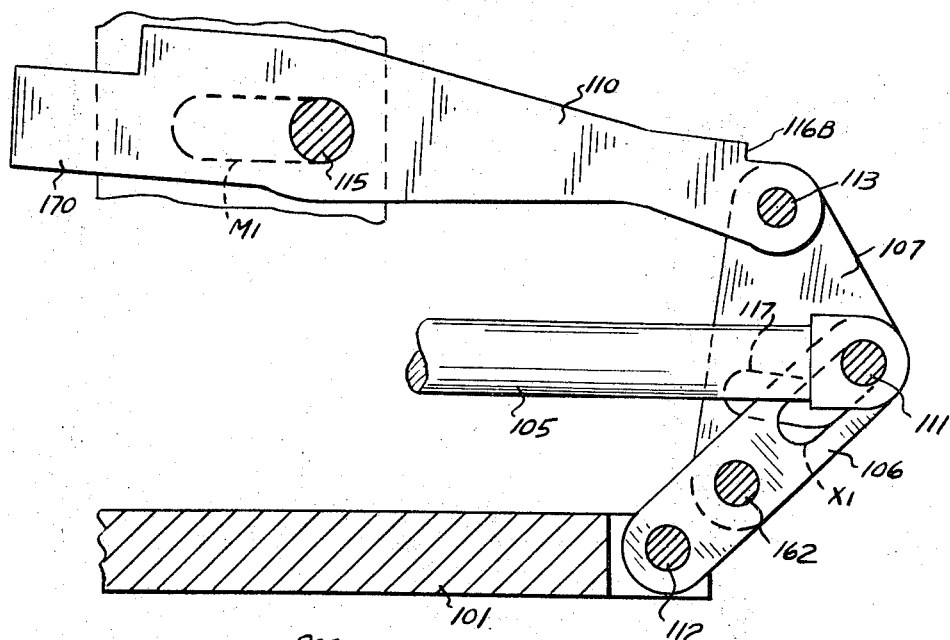
FIG. 5 is a vertical section of a modified form of clamp, with parts shown in released position.

Release (FIG. 5). The cylinder 3 is pressurized reversely at P2 so that its piston and piston rod move to the right, swinging link 106 clockwise on fixed pivot 112, with pin 111 riding in slot 117. Plate 107 shifts to the right and downwardly, swinging with pin 162 which connects link 106 to plate 107, and which moves to the right as link 106 swings to the right. As links 106—107 shift, pin 111 rides in slot 117 to its end.

Pin 113 moves to the right and down to release arm 110 from being held at 116A—116B and shifts left end 170 of arm 110 up and to the right, pin 115 of arm 110 sliding to the right in body slot M1, thus releasing pressure of clamp arm at 170 from the work piece.

ADVANTAGES

1. Two mechanical advantages are present between the piston and the left end 170 of clamp arm 110: (a) a) the toggle action provided by linkage 106—107, on end pivots 112-—113, with center pivot 111 connected to the piston rod 105; (b) b) the leverage of arm 110, centrally pivoted on pin 115 in body slot M1, and connected at one end to the toggle linkage 106—107 by pivot 113, and with the other end 170 engaging the workpiece.

Thus, tremendous clamping pressures may be applied at 170 with a relatively low fluid pressure available to the cylinder, to bias on the right or rod side of the piston.

2. Locking of the toggle links 106—107 and of the clamp arm 110, established when the piston has bottomed on the left end of its cylinder 4, insures clamping pressure at 170 on the workpiece being maintained indefinitely, even despite a possible failure of fluid pressure occurring after toggle links 106-—107 were locked in the locked position of FIG. 6.

3. The form of FIGS. 5—8 represents a design like the form of FIGS. 1—4, but with no detented action such as is provided at 68—69 (FIG. 1) but rather with the rise of arm 110 controlled by pin 111 riding in cam slots X1 and 117.

CONCLUSION

Now having described the workpiece clamps hereof, reference should be had to the claim which followS.

I claim:

1. In a workpiece clamp:
    a horizontal base part, a body providing a pressure cylinder, a piston therein, a horizontal rod for said piston above said base part, a horizontal clamping lever above said rod and pivoted to said body by a pin fixed centrally in said lever and riding in horizontal slot means provided on said body, said lever having a workpiece engaging part at its left end;
    a first toggle link connected at its upper end by a pivot pin to the right end of said lever;
    a second toggle link overlapping and below said first toggle link and connected at its lower end to a right end of said base part;
    a pivot pin connecting the lower end of the first link to a point on the second link;
    a central pivot pin connected to the right end of said piston rod to a point on both links where they overlap;
    with said first link having a bent cam slot, with a horizontal part and an upwardly and rightwardly inclined part, receiving the central pin;
    and with the second link having a slot also receiving the central pin;
    with said central pin and the slots receiving it being so arranged that when the piston rod is moved to the maximum leftward position as permitted by the slot of the first link, the central pin is over center of the toggle formed by said links for locking; and
    the slots also being so arranged that when the rod is moved to the right its central pin cams the first link clockwise and rocks the lever clockwise and also pulls it to the right as permitted by the slot means on said body.